H. H. COLLINGS.
MEANS FOR ATTACHING THE SIDE ARMS TO SPECTACLE FRAMES.
APPLICATION FILED MAR. 25, 1916.

1,271,669.

Patented July 9, 1918.

Inventor:-
Harry Harris Collings.
per Rayner & Co.
Attorneys.

UNITED STATES PATENT OFFICE.

HARRY HARRIS COLLINGS, OF WEST END, COWBRIDGE, WALES.

MEANS FOR ATTACHING THE SIDE ARMS TO SPECTACLE-FRAMES.

1,271,669.     Specification of Letters Patent.     Patented July 9, 1918.

Application filed March 25, 1916. Serial No. 86,606.

*To all whom it may concern:*

Be it known that I, HARRY HARRIS COLLINGS, subject of the King of Great Britain and Ireland, residing at West End, Cowbridge, in the county of Glamorganshire, Wales, watch and clock maker, have invented certain new and useful Improvements in Means for Attaching the Side Arms to Spectacle-Frames, of which the following is a specification.

My invention relates to a simple means for attaching the side arms to spectacle frames which will enable the wearer or any person to readily substitute a new side for a damaged or broken one without the necessity for using any tools. My device has the advantage over existing methods, that it is unnecessary to interfere with any other part of the spectacles as is the case with the existing method of attachment and avoids removal of the small screw which secures the rim of the frame around the lens, thus preventing derangement of the lens. My device has the further advantage that a single pattern of side is suitable for use on either left or right of the spectacle frame.

The further object of my invention is to provide a construction whereby the danger of twisting or breaking the arms when the spectacles are not in use or the straining of the joints between the arms and the spectacle frame is much reduced.

The further object of my invention is to provide a construction whereby the arms will fulfil their true function only *i. e.* they will act as ties between the spectacle frames and the ears.

According to my invention the end of the side arm is provided with a hook form of catch such as a swivel, bolt-ring or like catch, in which a portion of the catch engages in the eye on the side of the spectacle frame, while a movable portion closes the gap and secures it in position. This catch may comprise a hook catch with spring operated movable piece for closing the gap similar to the well known watch-swivel type of catch. A suitable method of constructing such a catch consists in bending the end of the side arm to the desired hook shape and securing a small spring blade in position to normally close the gap but capable of being pressed back to allow the catch to be engaged in the eye on the spectacle frame. A ring bolt type of catch comprises a tubular ring having a gap to engage over the eye on the spectacle frame, and a slidable bolt or pin in the tubular ring adapted to be engaged through the hole in the said eye. This bolt is operated by the finger and may be normally held in the closed position by means of a spring.

Owing to the absence of any rivet, rusting in of the rivet and consequent breakage of the eye on the side of frames are prevented.

In order that my invention may be more readily understood, reference is had to the accompanying drawings in which:—

Figure 1:
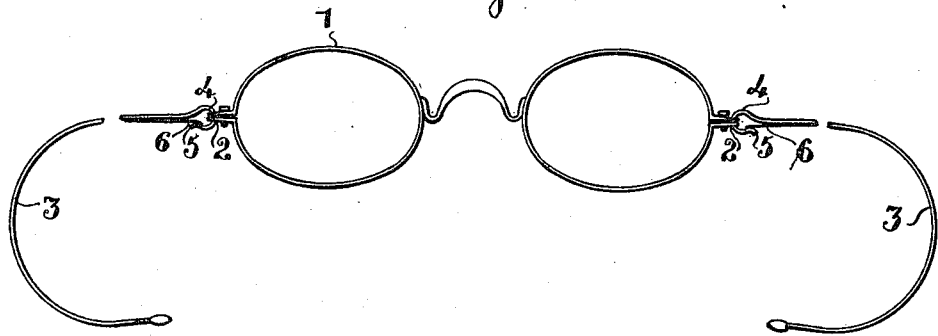
Figure 1 shows a curl-side spectacle frame having the side arms attached according to my invention.
Figure 2:
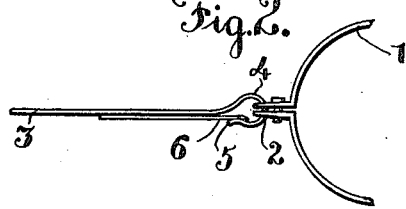
Fig. 2 is a detail view to an enlarged scale of the form of fastening employed in the frame shown in Fig. 1.

Referring to Figs. 1 and 2. The spectacle frame 1 which is of ordinary construction is provided with eyes 2 at the outer end of each of the lens holders. The curl-sides 3 are provided at their ends with a bent round end 4 forming a hook, the extreme end 5 of which is brought close to the junction between the end of the curl-side 3 and the hook 4, but leaving a sufficient gap to allow the hook 4 to be threaded through the eye 2. This gap is normally closed by means of the spring blade 6 which will be pressed back to allow the hook 4 to be threaded through the eye 2, afterward springing back and closing the gap as shown in Figs. 1 and 2. In Fig. 1 it will be seen that both the curl-sides 3 are identical and are interchangeable, it being unnecessary to have a right and left hand side as at present.

Figure 3:
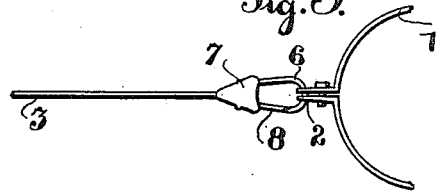
Fig. 3 is a detail view to an enlarged scale of a modified construction of swivel type fastening device and Fig. 4 is a similar view showing a bolt-ring type of fastening.

In Fig. 3, a watch swivel type of fastening is provided on the end of the side 3. This fastening comprises a hook 6 secured in the body 7 and a movable portion 8 hinged to the body and normally held in a position to close the gap between the end of the hook and the body by means of a spring within the body.

Figure 4:
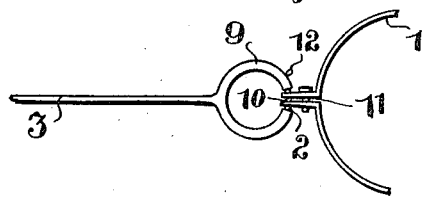

Referring now to Fig. 4, a hollow annular ring 9 is mounted on the end of the side 3 and has a cut away portion or gap 10 provided opposite the point at which it joins the side 3. This gap 10 is engaged over the eye 2 on the spectacle frame as shown in the drawing, and a sliding bolt 11 is pressed forward by means of a spring within the hollow annular ring 9, so as to pass through the hole in the eye 2 and secure the side 3 in position. A pin or knob 12 is provided on the bolt 11 by means of which the latter may be drawn back against the action of the spring in order to allow the side 3 to be attached or detached at will.

In a modification the eye may be provided upon the end of the side arms and the fastening device mounted upon the rims of the spectacle frame.

What I claim as my invention and desire to secure by Letters Patent is:—

The combination with a spectacle frame having eyes formed at the ends thereof, of side-arms each having one end bent over to form a hook adapted to be engaged with one of said eyes, a light leaf spring secured on each side-arm near the bent-over end thereof and engaging by its end the end of said hook substantially as set forth.

HARRY HARRIS COLLINGS.

Copies of this patent may be obtained for five cents each, by addressing the "Commissioner of Patents, Washington, D. C."